Feb. 3, 1970  J. E. WOLFE ET AL  3,493,073
ACOUSTIC HOLOGRAPHIC APPARATUS WITH VISUAL DISPLAY
Filed Jan. 2, 1968
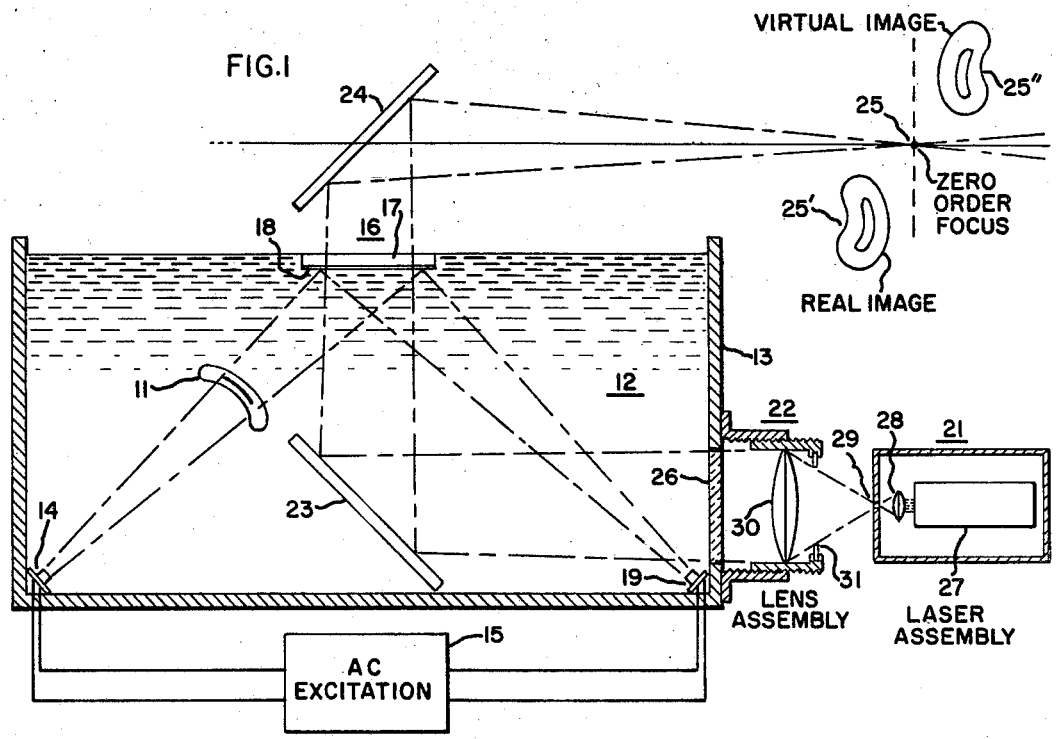
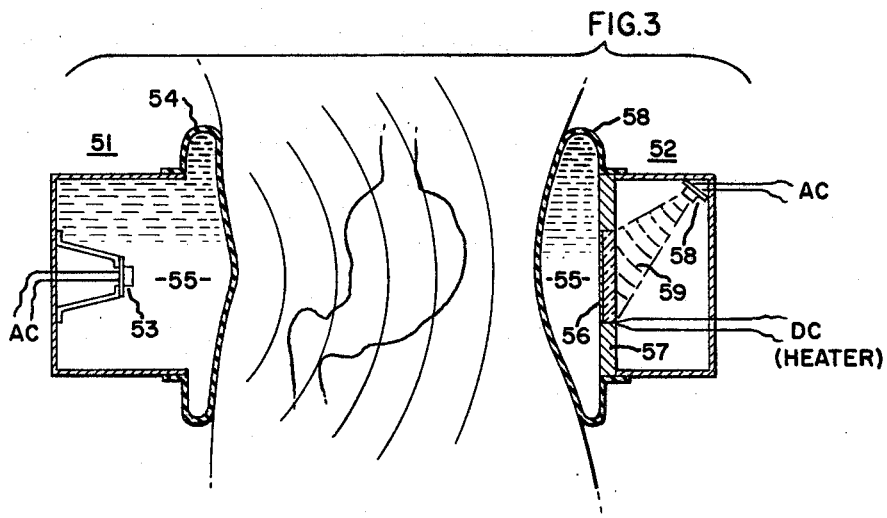
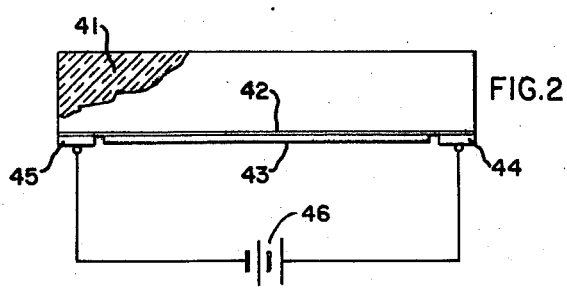
INVENTORS:
J. EDMOND WOLFE,
JOHN D. YOUNG,
BY *Richard V. Lang*
THEIR ATTORNEY.

United States Patent Office 3,493,073
Patented Feb. 3, 1970

3,493,073
ACOUSTIC HOLOGRAPHIC APPARATUS WITH VISUAL DISPLAY
John Edmond Wolfe, Camillus, and John D. Young, Fayetteville, N.Y., assignors to General Electric Company, a corporation of New York
Filed Jan. 2, 1968, Ser. No. 695,014
Int. Cl. G10k *11/00;* H04b *13/00;* G03b *27/00*
U.S. Cl. 181—.5       17 Claims

ABSTRACT OF THE DISCLOSURE

Apparatus for instantaneously creating an acoustic holographic image in a temporary or permanent form is described. The hologram is impressed upon the suface of a pressure deformable liquid or liquified thermoplastic material applied in a thin layer upon the surface of a rigid substrate. A visual reconstruction of the hologram is obtained by illumination of the deformed surface with coherent light, such as is obtained from a laser.

BACKGROUND OF THE INVENTION

Field of the invention

The invention relates to the field of holography which is a technique dependent on wave interference phenomena for recording and reconstructing visual images having three dimensional properties. For some time it has been recognized that the waves used to make the recording need not be the same as those used to reconstruct the visual image. While visual perception can rarely penetrate beyond the surface of objects because of their opacity to light, visual perception may be extended into the interior of a body when acoustic waves to which the body is not opaque are employed. If the body possesses interior features which suitably affect the acoustic waves, the acoustic hologram will record these features. If the acoustic hologram is then visually reconstructed, these interior features will be made visible.

Description of the related art

Since the field of acoustic holography is rapidly unfolding, the degree to which current developments are prior is unknown. Therefore, without intent to concede priority thereto, but for purposes of orientation alone, one may consider certain techniques variant from those asserted herein.

The possibility of deriving acoustic holograms for visual image reconstruction has been appreciated for some time, but the techniques proposed have been relatively inconvenient. One proposal has been to scan the acoustic field point by point with a tiny acoustic transducer. The technique poses severe problems in the time required to acquire data for a detailed image. Another proposal has been to derive an image from the free surface of a liquid with the holographic waves impinging on the surface from inside the liquid. The approach poses severe problems of surface stability with the surface of the liquid tending to respond to a wide variety of extraneous influences. A technique for recording the hologram in the acoustically deforming medium itself does not seem to have been proposed.

SUMMARY OF THE INVENTION

It is accordingly an object of the invention to provide an improved apparatus for deriving an acoustic hologram suitable for reconstruction of a visual image.

It is another object of the invention to provide a novel acoustic holographic apparatus capable of instantaneously forming an acoustic hologram and reconstructing an optical image from it.

It is a further object of the invention to provide a novel acoustic holographic apparatus having improved immunity to extraneous acoustic disturbances.

It is still another object of the invention to provide a novel acoustic holographic apparatus directly responsive to the acoustic hologram.

It is an object of the invention to provide a novel acoustic holographic apparatus for directly recording the acoustic hologram permanently.

These and other objects of the invention are accomplished by a novel holographic apparatus having a pair of coherent acoustic sources, one for illuminating an object and the other for providing reference illumination, and a pressure responsive means upon which the acoustic hologram is formed, comprising a rigid substrate and a pressure deformable liquid adherent to the substrate. In one form the pressure deformable liquid is a liquified thermoplastic material, which upon solidification records the sonic hologram. In order to achieve sensitivity to acoustic radiation pressure, the surface of the pressure deformable liquid is made sonically reflective by a suitable choice of acoustic impedances for the deformable liquid itself and its environment, preferably consisting of a second liquid, in which it is immersed and in which the object may be immersed. In order to minimize sensitivity to extraneous disturbances, the deformable liquid is maintained in a thin layer not appreciably exceeding a wavelength of the sonic wavelength. When the sonic hologram is illuminated by coherent optical radiation the holographic visual images are reconstructed. The apparatus provides means for viewing the object in real time or for making a recording of the sonic hologram for viewing at any time.

BRIEF DESCRIPTION OF THE DRAWING

The novel and distinctive features of this invention are set forth in the claims appended to the specification. The invention itself, however, together with further objects and advantages thereof may best be understood by reference to the following description and accompanying drawings, in which:

FIGURE 1 is an elevation view of a first embodiment of the invention in which an acoustic hologram is created and visually imaged in real time;

FIGURE 2 illustrates a second holographic sensor suitable for use in the apparatus illustrated in FIGURE 1, permitting either real time viewing of a visual image or recording of the visual image; and FIGURE 3 illustrates a second embodiment of the invention suitable for recording acoustic holograms and applied to the in-depth examination of physical structures.

DESCRIPTION OF THE PREFERRED EMBODIMENTS

Referring now to FIGURE 1, there is shown in a simple side elevation view, a holographic apparatus for imaging an object under acoustical illumination. The object is shown at 11 immersed in a fluid 12, typically water, which is confined by a container 13. The object 11 is illuminated acoustically by a first source, which is an electromechanical transducer 14, electrically connected to a source 15 of alternating electric potentials. The transducer 14 may take the form of a small piezoelectric disc vibrating in a simple thickness mode mounted upon a quarter wave plate or with its back surface enclosed to prevent back radiation. The source 15 may be of from 2 to 60 megacycles in sonic frequency. The transducer 14 and the object 11 are so arranged that acoustic energy projected through the object 11 impinges upon the sensor 16. The sensor 16 comprises a glass or transparent plastic substrate 17 on the under surface of which a thin layer 18 of pressure deforming fluid is applied. The pressure sensitive fluid, in addition to being adherent to the substrate, should be immiscible with water, have a differing acoustic impedance, be optically transparent, and have an index of refraction appreciably diverging from that of water. It should also have an adequately low viscosity to permit point-to-point variation in thickness in accordance with localized pressure variations. A second source of coherent acoustic energy is provided by transducer 19. This provides the "reference" source. The transducer 19 may be similar to transducer 14 and is simultaneously excited by source 15. The transducer 19 should be so arranged that the energy projected from it impinges directly upon the sensor 16.

The transducers 14 and 19 each produce slightly diverging beams of coherent sonic energy whose cross-section embraces a major portion of the pressure sensitive layer 18. They are sufficiently remote in terms of the short acoustic wavelengths employed so that each transducer's wave front is smooth at the sensor surface. The cross-section of the beam and corresponding acoustically illuminated area of the sensor 16 determine the dimensions of the field of view. Objects either less than, or larger than, the viewing area may be examined, or the equipment may be rescaled for viewing larger objects. The wavelength of the acoustic energy determines the minimum resolvable detail in the object. At 5 megacycles acoustic frequency, this is approximately 0.01 inch. With both transducers of the foregoing apparatus in operation, a holographic distribution of acoustic wave energy will be created on the under surface of the sensor 16 and it is impressed in the oil layer 18.

The oil layer 18, which is kept thin (typically about one-third the acoustic wavelength), is adherent to the rigid planar substrate 17. The specific gravity of the oil is preferably close to that of the fluid in which it is immersed to minimize any buoyant effects which would tend to cause a lateral flow or consequent thickening of the oil due to any accidentally higher or lower regions in the substrate. By these measures, the oil layer is kept uniformly thin and in a generally planar disposition. In the absence of acoustic energy, surface tension in the oil layer, acting like a stretched elastic membrane, tends to maintain its surface layer microscopically smooth.

When acoustic energy is applied, however, the surface of the oil is observed to be rippled into tiny elevations and depressions. In fact, in the absence of any object in the path of the transducers 14 and 19, the elevations and depressions in the oil surface will be observed to correspond to the wave interference fringes that one would expect from two sources of coherent radiation of appropriate frequency and mutual angular disposition.

The deformation of the oil surface may be explained as being caused by two mechanisms both generally resulting from acoustic radiation pressure. One mechanism, arising at the interface between the oil layer and the water is a result of the discontinuity in the acoustic impedances of the two adjacent fluids. The discontinuity in acoustic impedance causes the reflection of a backward wave with its own backward radiation pressure causing a sharp loss in forward radiation pressure. In reaction to the change in radiation pressure, the elastic membrane separating the two fluids is stretched and a localized depression is created in the surface of the oil layer.

This mechanism is vectorial in nature and gives rise to the wave interference fringes. At any point on the oil surface, a pair of dynamic vector quantities are present, one from each source of acoustic wave energy. Moving from point to point on the surface of the oil, the phase of these vector quantities will vary at a regular spacial rate. Their combination, i.e., their resultant vector, will also vary through maxima and minima from point to point over the oil surface at a new spacial rate, determined by the rules of wave interference phenomena. Corresponding to the spacial variation in the resultant intensity vector, there will occur a corresponding point-to-point variation in the backward radiation pressure. Thus points on the oil surface will deflect and create wave interference fringes.

A second effect upon the oil surface is attributable to the so-called streaming effect of radiation pressure arising from the continuous absorption of energy from the wave as it progresses through a fluid. Many oils exhibit an appreciable loss effect which would tend to support the streaming phenomenon. However, since the oil layer is thin, the absorbed energy is small and the surface depressive effect slight. There is also a gross, primarily scalar streaming effect as the beam passes through the water. This effect does not exhibit wave interference effects that give rise to the holographic image. Thus some grosser flattening of the projected oil layer may be caused, as the beam impinges on the oil around the outline of the object, or with varying intensity within it, but these effects will not usefully contribute to the formation of first or higher order holographic images.

The primary holographic mechanism therefore, appears to be that occurring at the interface of the two fluids and this effect is proportional to their disparity in acoustic impedances. The sensitive oil layer should therefore have an acoustic impedance differing from that of water.

The acoustic impedance of a material is proportional to the product of the velocity of sound or acoustic energy in the material times its density. In the case of water, the velocity of sound is generally given as $1.5 \times 10^5$ centimeters per second at room temperature. Oils having approximately the same density as water and sonic velocities of from $2\frac{1}{2}$ to $5 \times 10^5$ centimeters per second are commonplace and are quite satisfactory for this application. If other immersion fluids are used instead of water, similar differences in acoustic impedances should also be maintained.

Surface tension tends to flatten the oil layer 18 in dynamic opposition to localized increases in pressure produced by the sonic waves which tend to roughen the oil layer. This elastic property can be measured and is usually regarded as a property jointly of the oil and the water which make up the interface. For optimum recording, it is important that the oil layer exhibit strong surface tension effects while in contact with the water and that the two fluids be generally immiscible. Like other elastic phenomenon, a stronger effect increases the linearity of thickness variation with applied pressure, though at the cost of sensitivity, and accordingly a compromise is required. Finally, the viscosity of the oil determines the rapidity of response of the oil layer to exposure to the sonic field. Ordinarily, a rather low viscosity oil is selected for this purpose, thereby permitting an exposure to be substantially complete in periods of substantially less than a second.

A typical value for the surface tension of the oil-in-water surface contact is in the vicinity of 100 dynes per centimeter. The viscosity of the oil may have a typical value of 1,000 centistokes at room temperature.

The typical power levels for the illuminating energy are between $\frac{1}{10}$ and one watt per square centimeter at the surface of the oil, with the lower values tending to be preferable. The source 15, however, should be capable of substantially higher power levels than this to compensate for sonic attenuation in the immersion fluid.

The thickness of the oil layer 18 is of substantial importance in making good holographic recordings of the desired acoustic wave forms. As earlier mentioned, the oil layer must adhere to the substrate and this will tend to immobilize a thin film of the oil layer to that rigid surface. It will also, due partly to adhesive, partly to cohesive and partly to surface tension effects, tend to retain the oil layer in the generally flat distribution originally made of it on the under surface of the substrate.

If that layer is kept thin, the ability of it to respond to large area displacements of the immersion fluid will be minimized. To respond to large area disturbances in the immersion fluid, a large quantity of oil in the layer 18 must be laterally displaced over the surface of the substrate. The extreme difficulty of accomplishing such large displacements may be visualized as one of moving a relatively large volume of oil through a narrow passage—typically the .003″ depth of the oil layer.

Thus the thinness of the layer 18 may be regarded as creating a high pass spacial filter in the oil layer, which markedly reduces its responsiveness to undesired large area (and low frequency) displacements in the immersion fluid. The sensitivity of the layer 18 to recording the hologram is only perceptibly reduced by choosing so thin a layer, since its component waves and their resultant fringes are dimensionally small. In formation of the hologram, the oil need only be laterally displaced a distance approximately a wavelength through a comparatively wide passage whose depth is perhaps a third wavelength and thus essentially non-restricting to such flows. Accordingly, by removing the unwanted disturbances, the clarity of the hologram is greatly improved, with little loss in sensitivity. Practical considerations indicate that the thickness of the oil layer is optimum at approximately ⅓ the acoustic wavelength employed, and that the thickness should lie within a range of three from this optimum value (0.1 to 1.0 wavelengths).

Further provision must also be made dependent on the optical use to be made of the holographic recording. While this view will be supported in later discussion, it may be noted that in the optical display technique of FIGURE 1, that the oil layer 18 should have an index of optical refraction which differs substantially from that of the immersion fluid in order to develop an image. A suitable value for the oil is 1.6 versus 1.33 for water. In addition, the depth of the recording should be such as to excite little more than the first order optical images. This corresponds to restricting the depth of optical modulation to what produces less than 10° to 15° phase shift in light waves at the upper exit surface of the substrate. This makes for relatively shallow recordings, measured in terms of acoustic wavelengths. The actual depth of the grooves measured in wavelengths of the illuminating light, will usually be less than one, assuming the usual differences in indices of optical refraction between the adjacent fluids at the recording surface.

Suitable compositions for the oil are described in U.S. Patents 3,125,634; 3,125,636; 3,135,636 and 3,125,637, all assigned to the General Electric Company. A wider range of oils may be employed than those specifically disclosed in the cited patents, since the present acoustic process does not require the enhanced electrical properties nor reduced vapor pressure for operation in a vacuum environment.

With the foregoing arrangement, it may be seen that the requisites for making a holographic impression of the object 11 upon the pressure responsive layer 18 have been provided. If the object 11 takes the form of animal tissue or other material which is not sonically opaque and which contains structural members of differing acoustic opacities, or contains boundaries between parts having different acoustic impedances, the recording will depict internal structural aspects of the object.

For viewing this holographic record, the means 21, 22, 23 and 24 are provided. They include a laser assembly 21 for generating a beam of coherent light lying within the visible spectrum, a lens assembly 22 for creating a converging beam of appropriate cross-section to illuminate the pressure responsive sensor 16. The light from the laser and lens assembly is shown entering the container 13 through a light transmissive opening 26 and impinging upon a mirror 23, which redirects the laser radiation upwardly through the sensor 16. Preferably, the laser illumination is orthogonal to the surface of the sensor 16 and is clear of the object 11. Laser illumination which has passed through the sensor 16 is reflected by a second mirror 24 which directs the light horizontally to the zero order focus at 25, at a place for convenient observation.

The laser assembly 21 contains a light source 27 developing a coherent planar beam of light of ⅛″ to ³⁄₁₆″ in diameter. The light may be 6900 angstroms in wavelength, and the source 27 a helium neon gas laser. The beam of light is directed toward a short focal length lens 28, typically an 8 millimeter lens, similar to that used as a microscope objective. The lens 28 is placed at approximately 8 millimeters from a tiny aperture or pin hole 29 in the laser assembly and focuses the laser beam thereon. The pin hole 29 may be of 5 or 6 microns in diameter. The laser assembly 21 thus produces a strongly diverging beam of coherent light through the pin hole 29, which is collected by the lens assembly 22.

The lens assembly 22 is adjustably mounted for axial movement and comprises a lens 30 of approximately 8″ focal length having an adjustable iris 31. The axial adjustment of the field lens with respect to the illuminated pin hole 29 determines the location of the zero order focus shown at 25. Adjustment of the iris 30 determines the illuminated area of the sensitive layer 18. The lens assembly 22 produces a slightly converging beam focusing the pin hole at the zero order focus 25 at 10 feet or more (path length) from the aperture, at which setting the images 25′ and 25″ will be near life size.

The displacement of the images 25′ and 25″ along the optical axis from the zero order focus are dependent upon both the radius of curvature of the scattered acoustic radiation from the object measured at the plane of the sensor 16 and a multiplication factor dependent upon the wavelength ratio between the acoustic illumination and the optical illumination. This tends to throw the images 25′, 25″ somewhat further than the scale of the drawing would indicate from the zero order focus. The lateral (angular) displacement of the first order images 25′ and 25″ from the optical axis is a function of both the wavelengths of the acoustic illumination and the angle at which they intersect upon the sensor 16, which control the distance between interference fringes in the sensor. The closer the fringes, the larger the angle that the first order images will be displaced laterally of the optical axis.

Both of the images 25′ and 25″ are usable and retain the spacial information which has been recorded upon the pressure sensitive 18. Thus, as the observer's eyes are moved orthogonally to the horizontal optical axis or the observer's viewing focal plane is adjusted parallel to the optical axis, the images so formed may be explored in three dimensions as is true of other holographic images.

The optical images 25′, 25″ are formed by point-by-point variations in light intensity and the variations in light intensity are in turn dependent upon the acoustic properties of the object 11. Essentially all materials—solid, liquid, or gaseous—transmit acoustic vibrations and do this to a degree greatly surpassing their ability to transmit light. Thus, many objects whose outer surfaces are all that can be examined optically may be readily examined throughout their interior by acoustic vibrations. The acoustic examination technique, however, observes internal structures only in so far as the object material has regions of greater or lesser acoustic opacities or contains structures having discontinuities in acoustic impedance. Fortunately, many significant structural phenomena do produce a marked effect upon the acoustic wave and thus are recorded on the pressure sensitive layer. Boundary surfaces between bone and soft tissue, muscle and fat, and gas-filled voids in solids, all affect the acoustic waves applied thereto and are thereby imaged by this technique.

Since the opacities and reflectivities are also a function of the acoustic frequency employed, it is desirable that the source of acoustic excitation be suitably selected for the material under study, or if a versatile instrument is desired, it should possess a substantial range of variation in frequency. Attenuation effects generally increase with increases of acoustic frequencies. However, resolution improves as the acoustic frequency is increased. Accordingly, it is usually convenient to use the highest frequency which is consistent with tolerable attenuation.

A further consequence, and in many cases an advantage of the foregoing system, is that the optical images are expanded in depth dimension by a factor proportional to the ratio of the acoustic wavelength to the light wavelength in the immersion fluid. Assuming that the optical system returns the real image 25' or virtual image 25" to approximately natural size, this natural magnification along the optical axis will usually be in the range of 100 to 1,000.

The apparatus so far described in relation to FIGURE 1 may be used for direct visual observation of objects suspended within the acoustic beam. The observation may be made by placing one's eye in the general vicinity of the images 25' or 25". One may also probe the image in depth by use of a ground glass screen. Alternatively, if one wishes to record the image, one may use a view camera with the film in the image plane. An alternative way to obtain a permanent record of the image is to replace the oil in the pressure sensitive layer 18 by a thermoplastic material, momentarily liquified and then solidified, to record the acoustic hologram itself.

FIGURE 2 illustrates a sensor for recording the acoustic hologram using a thermoplastic material. It consists of a transparent sheet 41 of optically flat glass, typically a square of 2" to 4" on an edge and ⅛" thick, having a transparent, electrically conductive tin oxide layer 42 of approximately 1,000 angstroms thickness, and a 3-mil thick layer of thermoplastic recording material 43. A pair of electrodes 44 and 45 are arranged along one pair of opposed edges of the square in contact with the tin oxide layer 42. The electrodes 44 and 45 are suitably connected to a source 46 of electrical potentials. The voltage of source 46 and electrical impedance of the tin oxide layer are adjusted for heating the thermoplastic layer at about 4 watts per square inch. Upon heating the thermoplastic layer 43 above its softening point, it will deform in the same manner as the oil layer 18 previously described in accordance with applied acoustic energy. The water in which the layer 43 is immersed may be at room temperature or higher and the material of the thermoplastic layer employed should soften in the region of 60° C. for this application. The softening should be well under the boiling point of the water. To further avoid bubble formation, the water should be deaerated.

While a large number of known thermoplastic recording materials may be employed, a composition of diphenyl siloxane with a small addition of silicone oil or benzene has been found to be quite satisfactory. Other suitable thermoplastic recording compositions are described in U.S. Patent 3,147,062 to Glenn.

If a thermoplastic material is employed, during the interval that the recording is being made, one may use the image 25' or 25" as a check on what is being recorded. Once the heat is removed, the thermoplastic material cools down, retaining the same acoustically induced modulations that existed when it was fluid. Thus, the images 25', 25", will remain in the same condition as before, but permanently. Once made, the thermoplastic recording may be examined either by the optical system so far described, which contemplates passing the optical illumination through the immersion liquid 12 and thence through the sensor 16, or optionally, one may remove the thermoplastic recording from its immersed environment and use it in a separate, independent optical system. Needless to say, one may employ either the transmissive technique illustrated generally in FIGURE 1, or one may use a reflective technique wherein the laser illumination is directed toward the surface of the recording and reflected image is obtained. If it is desired to employ an optical illumination technique in which the acoustic recording is in air and thus not immersed in a fluid having an appreciable index of refraction, one may wish to reduce the depth of the recording. Alternatively, one may use a recording material having a small index of refraction and not reduce the recording depth. These measures have the effect of restricting the production of higher-than-first-order optical images by restricting the range of light modulation as it passes through the holographic recording to 10 to 15°.

A third inventive embodiment is illustrated in FIGURE 3. This embodiment is adapted for the internal examination of animal or human structures, torsos, limbs, extremities, digits, etc. The apparatus in FIGURE 3 consists of two parts; a first illuminating assembly 51, and a second recording assembly 52, each assembly containing a transducer. The illuminating transducer 53 is mounted within the assembly 51 and projects coherent acoustic vibrations generally into the specimen. Close acoustic coupling to the specimen is provided by a rubber membrane 54 which conforms to its irregular contours and which confines a fluid 55, such as water, in which the transducer 53 is immersed.

The recording assembly 52 employs a thermoplastic sensor 56 of the same type as is illustrated in FIGURE 2. It is supported on a rigid wall 57 of the recording assembly. To insure intimate acoustic contact between the thermoplastic surface and acoustic energy exiting from the specimen, a second rubber membrane 58 is provided sealed generally to this wall 57 and also confining a suitable fluid 55. The membrane 58 thus adapts itself to the contours of the specimen and the fluid 55 is in intimate contact with the thermoplastic layer of the sensor 56. Reference illumination of the thermoplastic layer is provided by the transducer 58 coupled through an acoustic prism 59 to the glass substrate of the sensor 56. To insure intimate acoustic contact between the substrate and the prism a small layer of oil may be provided between the adjacent surfaces. It may be observed that the transducer 58 projects acoustic waves at an angle to the acoustic waves derived from the transducer 53 which pass through the specimen. This produces the desired interference fringes in the thermoplastic material for creation of the holographic image.

In applications of the invention so far described, the illuminating acoustic energy has been shown passing through the object under study. Besides the use of back acoustic illumination, holographic images may also be derived using front and side acoustic illumination. Front acoustic illumination derives information particularly from reflective properties within the object under study and thus may be particularly useful when that interior contains reflective structures. Furthermore, while the object has been immersed in a liquid under holographic illumination in the arrangement so far described, it should be apparent that in many applications acoustic holograms may be obtained with the object in a gaseous environment.

While thermoplastic materials have been specifically discussed and may have greater convenience when a reusable material is desired, a large family of hardenable monomeric or partially polymerized materials may be used that go through a transition from liquid to solid in a short time interval. Such materials are those monomeric or partly polymeric materials which harden by undergoing a further chemical change. One example are the epoxies to which one may add an activator momentarily before hardening is desired. Another example are those which polymerize further under the influence of ultraviolet or X radiation.

What is claimed as new and desired to be secured by Letters Patent in the United States is:

1. Holographic apparatus for deriving an acoustic hologram spacially representing an object, comprising:
    (a) means for projecting coherent acoustic energy toward said object for modulation by said object;
    (b) pressure responsive means disposed to receive said modulated acoustic energy, said pressure responsive means comprising a rigid substrate having an appreciable area appropriate for imaging said object and a uniform thin layer of pressure deformable liquid adherent to said substrate on the surface thereof exposed to said modulated acoustic energy, deforming in response to point-to-point variations in acoustic intensity; and (c) means for illuminating said pressure responsive means with coherent acoustic energy of the same frequency as said first acoustic energy for formation of the holographic impression.

2. The apparatus set forth in claim 1 wherein said pressure deformable liquid is in the form of a uniform thin layer, having a thickness not appreciably exceeding one wavelength of said acoustic energy.

3. The apparatus set forth in claim 1 wherein said pressure deformable liquid is in the form of a uniform thin layer, having a thickness lying within the range of from one-tenth to one wavelength of said acoustic energy.

4. The apparatus set forth in claim 1 wherein said pressure deformable liquid is in the form of a uniform thin layer, having a thickness which is approximately one-third the wavelength of said acoustic energy.

5. The apparatus set forth in claim 1 wherein a liquid is provided for efficient exchange of acoustic energy with said object, said pressure deformable liquid being immersed in said liquid and being immiscible therewith, said liquids being acoustically dissimilar to render said deformable liquid sensitive to acoustic radiation pressure.

6. The apparatus set forth in claim 5 wherein said liquids have differing acoustic impedances to induce acoustic reflection at the interface of said liquids.

7. The apparatus set forth in claim 6 wherein said liquids have nearly equal specific gravities to avoid buoyant effects.

8. The apparatus set forth in claim 6 wherein said pressure deformable liquid is in the form of a thin layer, having a thickness not appreciably exceeding one wavelength of said acoustic energy.

9. The apparatus set forth in claim 8 wherein said pressure deformable liquid and said immersion liquid have differing indices of optical refraction.

10. The apparatus set forth in claim 9 additionally comprising:
(a) a source of coherent light; and
(b) means for directing said light upon the deforming surface of said pressure responsive means for creation of a holographic optical image.

11. The apparatus set forth in claim 1 wherein said pressure deformable liquid is a hardenable monomeric or polymeric material.

12. The apparatus set forth in claim 11 wherein said pressure deformable liquid material is a thermoplastic.

13. The apparatus set forth in claim 12 wherein heating means are provided for liquifying said thermoplastic.

14. The apparatus set forth in claim 12 wherein said thermoplastic material is in the form of a thin layer having a thickness not appreciably exceeding one wavelength of said acoustic energy, when said thermoplastic material is liquified.

15. The apparatus set forth in claim 14 wherein a liquid is provided for efficient exchange of acoustic energy with said object, said thermoplastic material being immersed in said liquid and being immiscible therewith when liquified, said liquids being acoustically dissimilar to render said deformable liquid sensitive to acoustic radiation pressure.

16. The apparatus set forth in claim 13 wherein said thermoplastic material and said immersion liquid have differing indices of optical refraction.

17. The apparatus set forth in claim 16 additionally comprising:
(a) a source of coherent light; and
(b) means for directing said light upon the deforming surface of said pressure responsive means for creation of a holographic optical image.

References Cited

UNITED STATES PATENTS

| | | | |
|---|---|---|---|
| 2,832,214 | 4/1958 | Trommler | 340—5 |
| 3,063,872 | 11/1962 | Boldebuck | 355—9 X |
| 3,137,837 | 6/1964 | Wreford | 340—5 |
| 3,400,363 | 9/1968 | Silverman | 340—3 |

OTHER REFERENCES

Mueller and Sheridon, "Sound Holograms and Optical Reconstruction," Applied Physics Letters, vol. 9, No. 9, Nov. 1, 1966, pp. 328–29.

BENJAMIN A. BORCHELT, Primary Examiner

T. H. WEBB, Assistant Examiner

U.S. Cl. X.R.
340—3, 5; 355—2